US012640417B2

(12) United States Patent     (10) Patent No.:   US 12,640,417 B2

Kuranuki     (45) Date of Patent:    May 26, 2026

(54) POWER SUPPLY SYSTEM, HEATING CONTROL METHOD, AND HEATING CONTROL PROGRAM

(71) Applicant: Panasonic Intellectual Property Management Co., Ltd., Osaka (JP)

(72) Inventor: Masaaki Kuranuki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 52 days.

(21) Appl. No.: 18/727,124

(22) PCT Filed: Dec. 21, 2022

(86) PCT No.: PCT/JP2022/047041

§ 371 (c)(1),
(2) Date: Jul. 8, 2024

(87) PCT Pub. No.: WO2023/136067

PCT Pub. Date: Jul. 20, 2023

(65) Prior Publication Data

US 2025/0079552 A1     Mar. 6, 2025

(30) Foreign Application Priority Data

Jan. 17, 2022    (JP) ................................. 2022-005046

(51) Int. Cl.
   *H01M 10/633*      (2014.01)
   *B60L 58/27*       (2019.01)
         (Continued)

(52) U.S. Cl.
   CPC ........... *H01M 10/633* (2015.04); *B60L 58/27* (2019.02); *H01M 10/486* (2013.01);
         (Continued)

(58) Field of Classification Search
   CPC .. H01M 10/651; H01M 10/65; H01M 10/633; H01M 10/63; H01M 10/60;
         (Continued)

(56) References Cited

U.S. PATENT DOCUMENTS 10,392,018 B1 *   8/2019   Rhodes ................... B60L 58/25
2005/0196662 A1    9/2005   Prema et al.
         (Continued)

FOREIGN PATENT DOCUMENTS

CN       113555625 A   * 10/2021   .......... H01M 10/625
CN       113696788 A   * 11/2021   .............. B60L 58/27
         (Continued)

OTHER PUBLICATIONS

International Search Report of PCT application No. PCT/JP2022/047041 dated Mar. 20, 2023.
         (Continued)

*Primary Examiner* — Erin M Piateski
*Assistant Examiner* — Ashley Tiffany Schoech
(74) *Attorney, Agent, or Firm* — WHDA, LLP

(57)            ABSTRACT

A heater heats a battery. A voltage measurement unit measures a voltage of the battery. A temperature measurement unit measures a temperature of the battery. A controller determines that the measured temperature of the battery, which is measured by the temperature measurement unit, is a temperature at which the heater is started, and controls a heating amount from the heater to the battery adaptively according to a voltage difference between the measured voltage during discharging of the battery and a reference voltage. For instance, the controller increases the heating amount as a voltage difference between a discharging lower limit voltage and the measured voltage during low-temperature discharging of the battery becomes small.

9 Claims, 8 Drawing Sheets

(51) Int. Cl.
H01M 10/48 (2006.01)
H01M 10/615 (2014.01)
H01M 10/625 (2014.01)

(52) U.S. Cl.
CPC ....... H01M 10/615 (2015.04); H01M 10/625 (2015.04); B60L 2240/545 (2013.01); B60L 2240/547 (2013.01); H01M 2220/20 (2013.01)

(58) Field of Classification Search
CPC .. H01M 10/615; H01M 10/61; H01M 10/625; H01M 10/486; H01M 10/48; H01M 2220/20; B60L 58/27; B60L 58/24; B60L 2240/545; B60L 2240/547; B60L 1/02; B60L 58/12; B60L 2240/62; B60L 2240/622; B60L 50/50; Y02E 60/13
See application file for complete search history.

(56) References Cited

U.S. PATENT DOCUMENTS

| | | | |
|---|---|---|---|
| 2009/0087723 A1 | 4/2009 | Inda | |
| 2011/0298427 A1* | 12/2011 | Uemura | H01M 10/66 320/134 |
| 2014/0180519 A1 | 6/2014 | Niimi | |
| 2015/0028019 A1* | 1/2015 | Kamachi | B60L 53/62 219/484 |
| 2015/0108114 A1* | 4/2015 | Beuning | H01M 10/615 219/492 |
| 2018/0281618 A1 | 10/2018 | Ogaki et al. | |
| 2020/0171975 A1 | 6/2020 | Ueda et al. | |

FOREIGN PATENT DOCUMENTS

| | | | | | |
|---|---|---|---|---|---|
| EP | 3637533 | A1 | 4/2020 | | |
| JP | H09-161853 | | 6/1997 | | |
| JP | H09161853 | A * | 6/1997 | | |
| JP | 2001234840 | A * | 8/2001 | | B60K 6/48 |
| JP | 2005-094992 | | 4/2005 | | |
| JP | 2008-103108 | | 5/2008 | | |
| JP | 2009-087814 | | 4/2009 | | |
| JP | 2012-252911 | | 12/2012 | | |
| JP | 2018014288 | A * | 1/2018 | | |
| JP | 2020-061244 | | 4/2020 | | |
| JP | 2020-096508 | | 6/2020 | | |
| WO | 2013/038492 | | 3/2013 | | |

OTHER PUBLICATIONS

The EPC Office Action dated Apr. 14, 2025 for the related European Patent Application No. 22920585.1.

* cited by examiner

Heating energy

POWER SUPPLY SYSTEM, HEATING CONTROL METHOD, AND HEATING CONTROL PROGRAM

CROSS-REFERENCE TO RELATED APPLICATIONS

This application is a U.S. national stage application of the PCT International Application No. PCT/JP2022/047041 filed on Dec. 21, 2022, which claims the benefit of foreign priority of Japanese patent application No. 2022-005046 filed on Jan. 17, 2022, the contents all of which are incorporated herein by reference.

TECHNICAL FIELD

The present disclosure relates to a power supply system, a heating control method, and a heating control program that have a function of heating a low-temperature battery.

BACKGROUND ART

When a battery is discharged (especially, as a power source) in a cold district, there is known a phenomenon in which a terminal voltage of the battery decreases to near a discharging lower limit voltage and, after that, the voltage is increased again by Joule heat or the like. If a battery is heated, a voltage drop will be suppressed, thereby increasing usable capacity of the battery. Therefore, in the specification corresponding to cold-district use, a battery is often heated.

Since a power supply used for heating can be obtained from a system, if a battery is connected to the system, battery capacity for heating the battery will be avoided from being reduced. However, if not connected to the system, the battery will be required to consume battery capacity for heating the battery. This causes such a dilemma that excessive heating is desired to be avoided, but discharge stop, which is caused by a voltage drop, is also desired to be avoided.

For instance, when a battery is heated to a threshold temperature constantly using a thermostat, more than necessary battery energy is consumed for heating. This may reduce energy to be used for an intended purpose, i.e., for supplying electric power to a target load (e.g., EV motor). Thus, usable time of the target load is likely to be shortened.

For battery control, the following method is proposed: a battery is heated or cooled such that an internal resistance thereof is decreased within a predetermined range, thereby adjusting temperature of the battery (e.g., see Patent Literature 1). Herein, the internal resistance is estimated based on detected values of a voltage and a temperature of the battery. Specifically, a drop in battery temperature is predicted in advance by focusing on a change in an SOC (State Of Charge), which is based on a driving schedule, and temperature dependence of the internal resistance, thereby setting the time to start temperature control.

CITATION LIST

Patent Literature

PTL 1: Unexamined Japanese Patent Publication No. 2020-61244

SUMMARY OF THE INVENTION

In the above-mentioned method, to reduce energy used for temperature adjustment, the temperature adjustment is performed based on a value of internal resistance as a reference. Herein, the internal resistance depends on temperature. To estimate the internal resistance precisely, an OCV (Open Circuit Voltage) and a CCV (Closed Circuit Voltage) need to be separated from each other. However, in a low-temperature discharge region, it is difficult to separate those perfectly, because the state inside an electrode plate is not uniform or the like. This causes an error in heating control. In consideration of the error, if a margin is added to a heating amount, the limited battery energy will excessively be consumed for heating. As a result, the energy to be supplied to a target load is reduced. In other words, the heating energy cannot be optimized sufficiently, so that a waste occurs.

The present disclosure is made in view of such a situation, and the object is to provide technology that optimizes an energy used for heating a battery.

To solve the above-mentioned problem, a power supply system of an aspect in accordance with the present disclosure includes: a battery: a heating unit for heating the battery; a voltage measurement unit that measures a voltage of the battery: a temperature measurement unit that measures a temperature of the battery; and a control unit that determines that a measured temperature of the battery measured by the temperature measurement unit is a temperature at which the heating unit is started, and controls a heating amount from the heating unit to the battery adaptively according to a voltage difference between the measured voltage during discharging of the battery and a reference voltage.

Hardware resources and software resources can be collaborated, or only hardware resources can be used to achieve a function of the control unit. As the hardware resources, a CPU, a ROM, a RAM, a GPU (Graphics Processing Unit), an ASIC (Application Specific Integrated Circuit), an FPGA (Field Programmable Gate Array), and the other LSIs can be used. As the software resources, an operating system and a program, such as an application, can be used. A storage unit, which includes nonvolatile recording media such as an HDD and an SSD, stores various kinds of data.

Note that, any combination of the above-mentioned components and a description of the present disclosure, which is changed between a device, a system, a method, a computer program, and the like, are also effective as an aspect of the present disclosure.

According to the present disclosure, energy used for heating a battery can be optimized.

DESCRIPTION OF EMBODIMENT(S)

Figure 1:
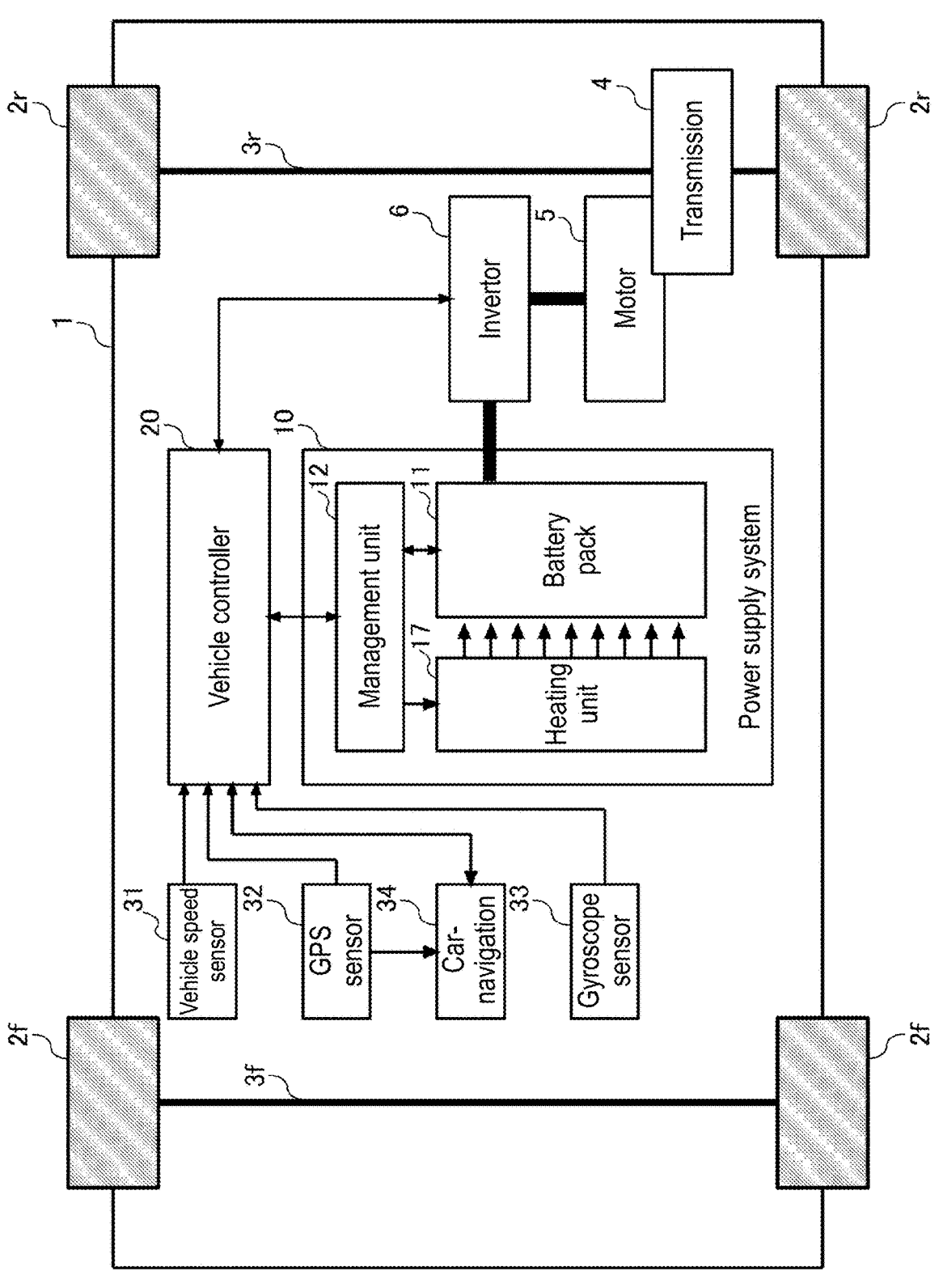
FIG. 1 is a view showing a schematic configuration of an electric vehicle in accordance with an exemplary embodiment of the present invention.

FIG. 1 is a view showing a schematic configuration of electric vehicle 1 in accordance with an exemplary embodiment of the present invention. Electric vehicle 1 shown in FIG. 1 is an electric vehicle (EV) of a rear-wheel drive (2WD) type that is provided with a pair of front wheels 2f, a pair of rear wheels 2r, and motor 5 as a power source. The pair of front wheels 2f are connected to front wheel axle 3f, and the pair of rear wheels 2r are connected to rear wheel axle 3r. Transmission 4 transmits the rotation of motor 5 to rear wheel axle 3r at a predetermined conversion ratio.

Power supply system 10 is provided with battery pack 11, management unit 12, and heating unit 17. Management unit 12 monitors and measures voltage, current, temperature, and SOC of two or more cells included in battery pack 11, and transmits them to vehicle controller 20 via an in-vehicle network as battery data. As the in-vehicle network, a CAN (Controller Area Network) and an LIN (Local Interconnect Network) can be used.

Heating unit 17 is a heating mechanism for heating battery pack 11. When a lithium ion battery is charged and discharged at low temperature, dendritic crystals are deposited on an electrode plate. This may cause degradation or fault. For instance, heating unit 17 is configured such that an electric heating sheet in which an electric wire heater is embedded is sticked on surfaces of two or more cells. Further, heating unit 17 may be configured to include a flow path, a heater, and a pump. The flow path is provided near two or more cells to pass a heating medium (e.g., heated water), the heater heats the heating medium, and the pump circulates the heating medium.

Typically, in an EV, a three-phase AC motor is used as motor 5 for driving. During power running, inverter 6 converts direct current power, which is supplied from battery pack 11, into alternating current power, and supplies it to motor 5. During regeneration, inverter 6 converts alternating current power, which is supplied from motor 5, into direct current power, and supplies it to battery pack 11. During power running, motor 5 is rotated according to the alternating current power supplied from inverter 6. During regeneration, motor 5 converts rotational energy, which is caused by deceleration, into alternating current power, and supplies it to inverter 6.

Vehicle controller 20 is a vehicle ECU (Electronic Control Unit) that controls the entirety of electric vehicle 1, and may be constituted by an integration type of VCM (Vehicle control module), for example. Various detection information, which indicates states of electric vehicle 1, is inputted to vehicle controller 20 from various kinds of sensors in electric vehicle 1. In FIG. 1, electric vehicle 1 is provided with vehicle speed sensor 31, GPS (Global Positioning System) sensor 32, and gyroscope sensor 33, as the various kinds of sensors.

Vehicle speed sensor 31 generates a pulse signal in proportion to rotational speed of front wheel axle 3f or rear wheel axle 3r, and transmits the generated pulse signal to vehicle controller 20. Vehicle controller 20 detects a speed of electric vehicle 1 based on the pulse signal received from vehicle speed sensor 31.

GPS sensor 32 detects positional information on electric vehicle 1, and transmits the detected positional information to vehicle controller 20. Specifically, GPS sensor 32 receives electric waves each of which includes a corresponding one of transmission times from a plurality of GPS satellites, and calculates the latitude longitude of a receiving point based on a plurality of transmission times each being included in a corresponding one of the received electric waves. GPS sensor 32 may be a GPS sensor built in car-navigation system 34.

Gyroscope sensor 33 detects angular velocity of electric vehicle 1, and transmits the detected angular velocity to vehicle controller 20. By integrating the angular velocity received from gyroscope sensor 33, vehicle controller 20 can detect a tilt angle of electric vehicle 1.

Car-navigation system 34 has digital road map data. With reference to the map data, car-navigation system 34 searches a route from the current position, which is detected by GPS sensor 32, to a destination inputted by a user of electric vehicle 1. Car-navigation system 34 performs route guidance based on the route selected by the user.

Figure 2:
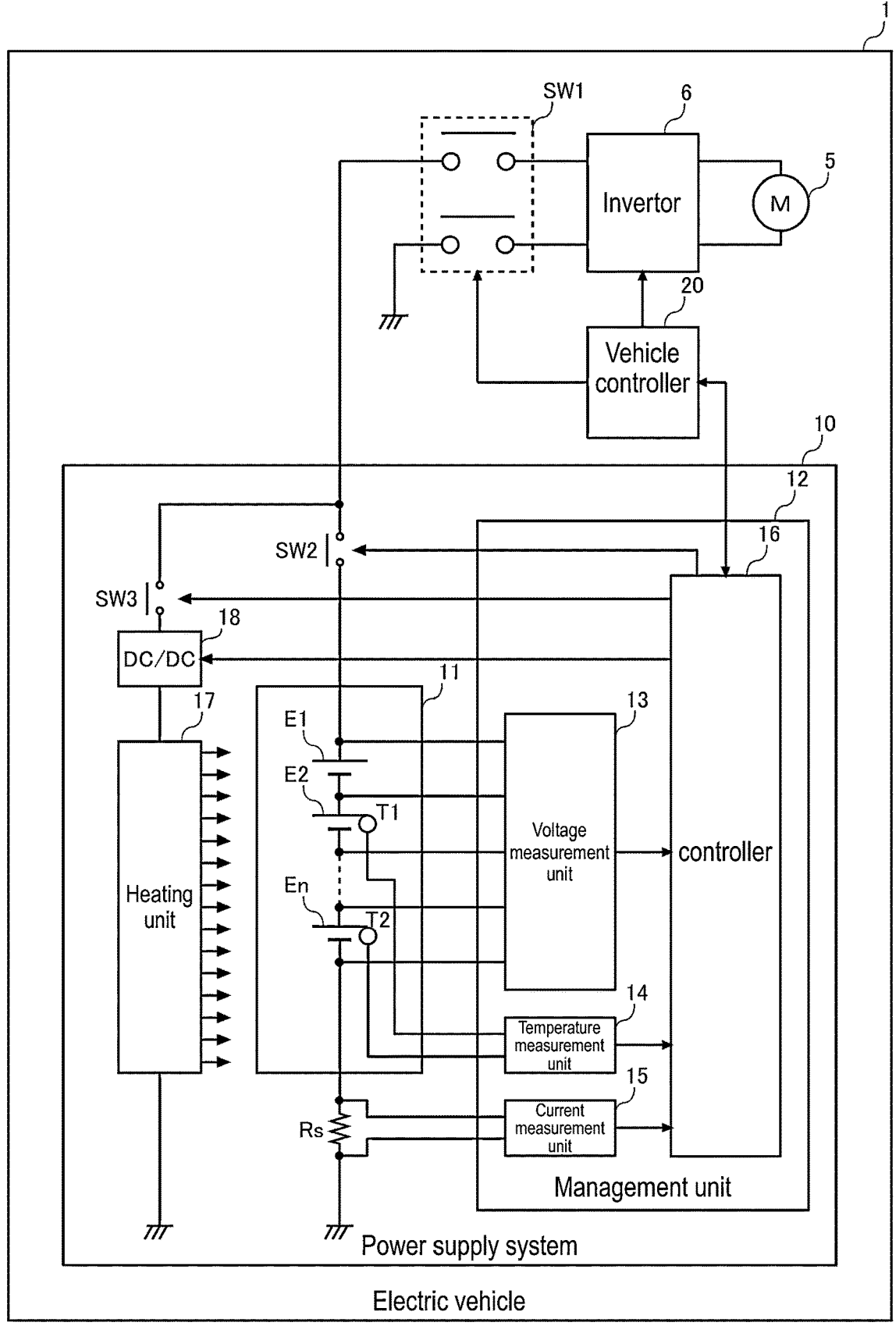
FIG. 2 is a view for describing detailed configuration of a power supply system of the electric vehicle shown in FIG. 1.

FIG. 2 is a view for describing detailed configuration of power supply system 10 of electric vehicle 1 shown in FIG. 1. Power supply system 10 is connected to motor 5 via first switch SW1 and inverter 6. First switch SW1 is a contactor that is inserted between wires connecting power supply system 10 and inverter 6. During traveling, vehicle controller 20 controls first switch SW1 to be in ON state (closed state), thereby electrically connecting power supply system 10 and a power system of electric vehicle 1. During non-traveling, vehicle controller 20 controls first switch SW1 to be in OFF state (open state) as a general rule, thereby electrically disconnecting power supply system 10 from the power system of electric vehicle 1.

Second switch SW2 is inserted between first switch SW1 and battery pack 11. Third switch SW3 is inserted between first switch SW1 and DC-DC converter 18. For each of first switch SW1 to third switch SW3, a relay may be used. Alternatively, a semiconductor switch may be used.

Battery pack 11 includes a plurality of cells E1 to En connected in series. Note that, battery pack 11 may be configured such that the plurality of cells are connected in parallel to constitute a plurality of parallel cell blocks, and the plurality of parallel cell blocks are connected in series. As the cell, a lithium ion battery cell, a nickel hydride battery cell, or the like can be used. Hereinafter, in the present description, it is supposed that a lithium ion battery cell (nominal voltage: ranging from 3.6 V to 3.7 V) is used as an example. The number of cells E1 to En connected in series is determined according to the drive voltage of motor 5.

Shunt resistor Rs is connected in series to the plurality of cells E1 to En. Shunt resistor Rs functions as a current detection element. Note that, a Hall element may be used instead of shunt resistor Rs. In battery pack 11, a plurality of temperature sensors T1 and T2 for detecting temperature of the plurality of cells E1 to En are disposed. A thermistor can be used for temperature sensors T1 and T2, for example. For instance, one temperature sensor may be provided for every six to eight cells.

Management unit 12 is provided with voltage measurement unit 13, temperature measurement unit 14, current measurement unit 15, and controller 16. Nodes of the plurality of cells E1 to En, which are connected in series, each are connected to voltage measurement unit 13 via a plurality of voltage wires. Voltage measurement unit 13 measures a voltage between two voltage wires adjacent to each other, thereby measuring a voltage of each of cells E1 to En. Voltage measurement unit 13 transmits the voltage of each of cells E1 to En, which has been measured, to controller 16.

Since the voltage in voltage measurement unit 13 is higher than that in controller 16, voltage measurement unit 13 and controller 16 are connected via a communication line, in the state where being insulated therebetween. Voltage measurement unit 13 can be constituted by an ASIC (Application Specific Integrated Circuit) or a general-purpose analog-front-end IC. Voltage measurement unit 13 includes a multiplexer and an A/D converter. By the multiplexer, the voltage between two voltage wires adjacent to each other is sequentially outputted to the A/D converter from the above. The A/D converter converts the analog voltage, which is inputted from the multiplexer, into a digital value.

Note that, a voltage divider resistor (not shown) may be provided to measure a terminal voltage of battery pack 11. Voltage measurement unit 13 measures the terminal voltage of battery pack 11 based on the voltage divided by the voltage divider resistor. Note that, in controller 16, voltages of the plurality of cells E1 to En may be added to estimate the terminal voltage of battery pack 11.

Temperature measurement unit 14 includes voltage divider resistors and an A/D converter. The A/D converter converts a plurality of analog voltages into digital values one by one, and outputs them to controller 16. Herein, the plurality of analog voltages each are divided by the plurality of temperature sensors T1 and T2 and the plurality of voltage divider resistors. Controller 16 estimates temperatures of the plurality of cells E1 to En based on the digital values, mentioned above. For instance, controller 16 estimates a temperature of each of cells E1 to En based on a value measured by the temperature sensor located closest to each of cells E1 to En.

Current measurement unit 15 includes a differential amplifier and an A/D converter. The differential amplifier amplifies a voltage between both ends of shunt resistor Rs, and outputs it to the A/D converter. The A/D converter converts the voltage, which is inputted from the differential amplifier, into a digital value, and outputs it to controller 16. Controller 16 estimates a current, which flows into the plurality of cells E1 to En, based on the digital value, mentioned above.

Note that, if the A/D converter is mounted within controller 16 and an analog input port is provided in controller 16, the analog voltage may be outputted to controller 16 by temperature measurement unit 14 and current measurement unit 15, and converted into the digital value by the A/D converter.

Controller 16 manages states of the plurality of cells E1 to En based on voltage, temperature, and current of the plurality of cells E1 to En, which are measured by voltage measurement unit 13, temperature measurement unit 14, and current measurement unit 15. If overvoltage, undervoltage, overcurrent, or temperature anomaly occurs in at least one of the plurality of cells E1 to En, controller 16 will turn off second switch SW2, thereby protecting the corresponding cell.

Controller 16 can be constituted by a microcontroller and a nonvolatile memory (e.g., EEPROM (Electrically Erasable Programmable Read-Only Memory), a flash memory).

Controller 16 estimates an SOC of each of the plurality of cells E1 to En. In controller 16, an OCV method and a current integration method are combined to estimate the SOC. The OCV method is a method in which an SOC is estimated based on an OCV of each cell, which is measured by voltage measurement unit 13, and an SOC-OCV curve of the cell. The SOC-OCV curve of a cell is prepared in advance based on a characteristic test, which is performed by a battery manufacturer, and registered in an internal memory of a microcontroller at the time of shipment.

The current integration method is a method in which an SOC is estimated based on an OCV at the beginning of charging-discharging each cell and an integrated value of currents measured by current measurement unit 15. In the current integration method, a measurement error of current measurement unit 15 is more accumulated as a charging-discharging time becomes longer. On the other hand, the OCV method is affected by a measurement error of voltage measurement unit 13 and an error caused by polarization voltage. Therefore, it is preferred to use a weighted average of the SOC estimated by the current integration method and the SOC estimated by the OCV method.

DC/DC converter 18 can lower a voltage of DC power supplied from battery pack 11 via second switch SW2 and third switch SW3 or a voltage of regenerated DC power from inverter 6 via first switch SW1.

DC/DC converter 18 controls a duty ratio, a phase difference, or a frequency of the internal switching elements according to a voltage command value and a current command value, thereby controlling the voltage and the current to be supplied to heating unit 17. Herein, the voltage command value and the current command value are set through controller 16. A heat generation amount of a heater in heating unit 17 depends on an amount of electric power supplied from DC/DC converter 18. In other words, a heating amount supplied from heating unit 17 to battery pack 11 is increased as the amount of electric power supplied from DC/DC converter 18 becomes large.

In the present exemplary embodiment, at a low temperature less than or equal to a predetermined temperature set in advance, controller 16 controls the current command value or the voltage command value, which are to be set in DC/DC converter 18, according to a voltage difference between the measured voltage during discharging of battery pack 11 and a reference voltage. Thus, controller 16 adaptively controls a heating amount (cheat generation amount of heater) supplied from heating unit 17 to battery pack 11 based on the measured temperature of battery pack 11 measured by temperature measurement unit 14. As the above-mentioned reference voltage, a discharging lower limit voltage or an OCV can be used. The discharging lower limit voltage is determined from a viewpoint of safety and deterioration suppression of battery pack 11. For instance, a value described in battery manufacturer's specification is used.

Based on the discharge characteristics, battery pack 11, which is required to be heated during discharging, determines that heating control is necessary at a threshold temperature ranging from −5° C. to −15° C. as a boundary, for example. The threshold temperature is defined as (heating threshold temperature). The heating threshold temperature is determined based on a discharge characteristic of terminal voltage (CCV) versus discharge capacity of battery pack 11 or each of cells E1 to En.

Figure 3:
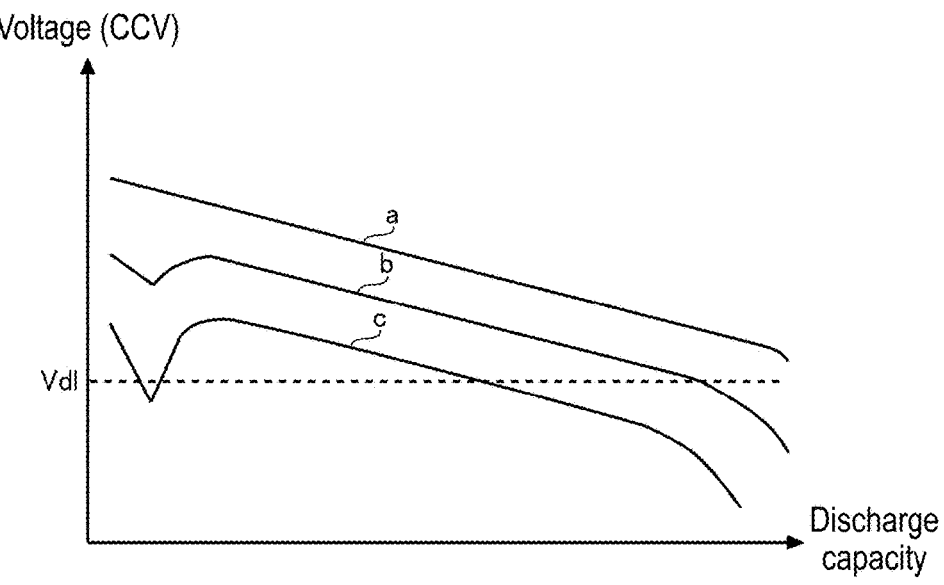
FIG. 3 is a view schematically showing an example of discharge characteristics.

FIG. 3 is a view schematically showing an example of discharge characteristics. When a lithium ion cell is uses as the cell, a discharge characteristic thereof depends on temperature. Therefore, the discharge characteristic has a different discharge curve, which indicates terminal voltage versus discharge capacity; depending on temperature. FIG. 3 shows discharge curves of discharge characteristic a, discharge characteristic b, and discharge characteristic c in a descending order of temperatures. The discharge curves of discharge characteristic a, discharge characteristic b, and discharge characteristic c indicate the ones at 20° C., 0° C., and −20° C., respectively, for example. For characteristic a, i.e., at temperature higher than a predetermined temperature, the discharge curve changes such that the terminal voltage is gradually decreased as the discharge capacity increases. However, for discharge characteristic b and discharge characteristic c, i.e., at temperatures lower than or equal to the predetermined temperature, the discharge curves change such that, after the terminal voltage is decreased with respect to the discharge capacity, the terminal voltage is increased due to an influence of heating caused by Joule's heat, and when discharging is progressed, the terminal voltage is decreased again. Herein, Joule's heat is generated by discharging. In other words, a discharge curve changes such that the terminal voltage is dropped locally.

For such a low-temperature discharge characteristic, the terminal voltage is decreased to less than or equal to discharging lower limit voltage Vd1 due to the local drop in terminal voltage, as shown in the discharge curve of discharge characteristic c. Thus, although the discharge capacity sufficiently remains, the discharging is prevented. The heating threshold temperature is set according to a temperature at which the discharge characteristic exhibits a discharge curve having the local drop in terminal voltage. Further, the heating threshold temperature is determined to be a temperature (e.g., −5° C. to 15° C.) at which the terminal voltage is decreased to less than or equal to a predetermined voltage due to the local drop in terminal voltage. Accordingly, controller 16 controls the heating amount from heating unit 17 to battery pack 11 based on a difference between the measured temperature, which is measured by temperature measurement unit 14, and the heating threshold temperature. Further, controller 16 controls heating unit 17 such that the terminal voltage is not decreased to less than or equal to the discharging lower limit voltage due to the local drop in terminal voltage. As the temperature of battery pack 11, controller 16 may use the lowest temperature among a plurality of temperatures detected by a plurality of temperature sensors provided in battery pack 11. Further, controller 16 may use a mean temperature of the plurality of temperatures, mentioned above. Note that, in the following description, low-temperature discharging means discharging at the temperature when heating is required.

Since internal resistance R of the cell becomes high as temperature becomes low, a cell voltage (CCV=OCV−I×R) during discharging is significantly lowered under low temperature. Therefore, to lower internal resistance R of the cell, battery pack 11 is required to be heated.

Figure 4:
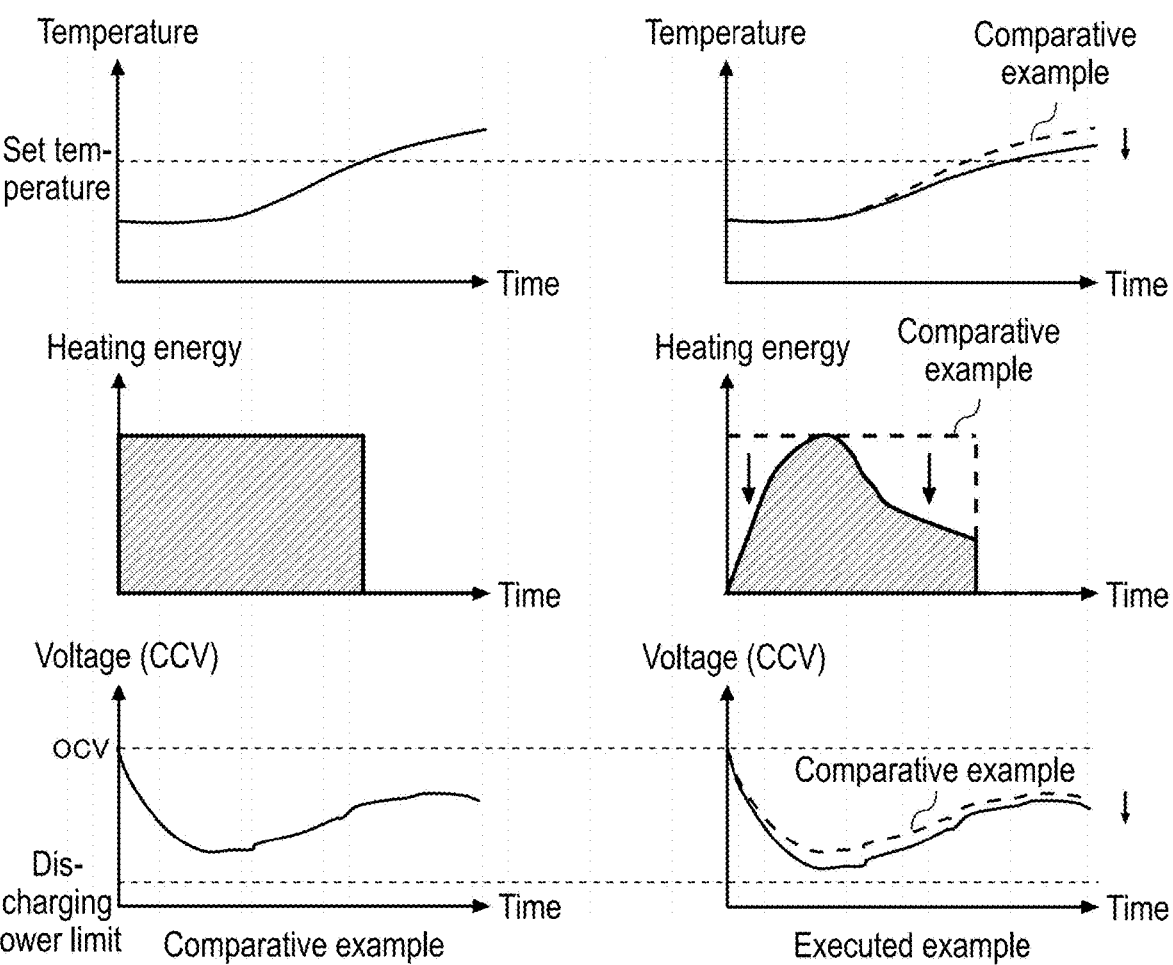
FIG. 4 is a view showing transition images of temperature of a battery pack, heating energy from a heating unit to the battery pack, and terminal voltage (CCV) of the battery pack through heating control during low-temperature discharging in accordance with a comparative example and an executed example.

FIG. 4 is a view showing transition images of temperature of battery pack 11, heating energy from heating unit 17 to battery pack 11, and terminal voltage (CCV) of battery pack 11 through heating control during low-temperature discharging in accordance with a comparative example and an executed example. FIG. 4 assumes the state where constant-current discharging is performed.

In the comparative example shown in the left-hand side, the cell is heated to a set temperature unconditionally using fixed energy. The set temperature, which serves as a temperature at which heating is stopped, may be set to the same temperature as the heating threshold temperature. Alternatively, the set temperature may be set to a temperature obtained such that a predetermined margin is added to the heating threshold temperature. Note that, the temperature of battery pack 11 rises after the heating is stopped due to heat capacity of each cell. Internal resistance R of each cell is lowered as the temperature of battery pack 11 rises, so that the terminal voltage (CCV) during discharging is increased.

In a cold district, heating energy used for heating battery pack 11 becomes large. This causes a significant decrease in capacity of battery pack 11. The decrease in capacity of battery pack 11 leads to a reduction in drivable distance of electric vehicle 1. In the comparative example, a margin is provided between the terminal voltage of battery pack 11 and the discharging lower limit voltage. Thus, it can be said that the capacity of battery pack 11 is excessively consumed by uniform heating from heating unit 17 to battery pack 11.

In the executed example shown in the right-hand side of FIG. 4, the minimum required heating for continuing traveling is performed within a range where the terminal voltage (CCV) does not fall below the discharging lower limit voltage. Specifically, heating energy is increased as the terminal voltage (CCV) of battery pack 11 becomes close to the discharging lower limit voltage of battery pack 11, and heating energy is decreased as the terminal voltage (CCV) becomes apart from the discharging lower limit voltage. In a region apart from the discharging lower limit voltage, excessive heating can be avoided by reducing heating energy. This makes it possible to save the capacity of battery pack 11, so that the SOC of battery pack 11 at the time of arrival at the destination can be more increased than that of the comparative example. The energy obtained by saving heating energy can be returned to energy for traveling.

A first heating control method is as follows: controller 16 increases a heating amount from heating unit 17 to battery pack 11 more as a voltage difference between measured voltage Vb_ccv of battery pack 11 during the low-temperature discharging and discharging lower limit voltage Vb_min becomes smaller. In other words, as shown in the following (Expression 1), controller 16 causes the heating amount to be inversely proportional to the above-mentioned voltage difference.

$$\text{heating amount} \propto 1/(Vb\_ccv - Vb\_min) \qquad \text{(Expression 1)}$$

A second heating control method is as follows: controller 16 increases a heating amount from heating unit 17 to battery pack 11 more as a voltage difference between an OCV of battery pack 11 and measured voltage Vb_ccv during low-temperature discharging becomes larger. In other words, as shown in the following (Expression 2), controller 16 causes the heating amount to be proportional to a voltage drop of battery pack 11 during low-temperature discharging.

$$\text{heating amount} \propto (Vb\_ccv - Vb\_min) \qquad \text{(Expression 2)}$$

Controller 16 sets a current command value or a voltage command value in DC/DC converter 18, according to the determined heating amount. Note that, PI (proportional integral) control and PID (proportional integral differentiation) control may be used instead of P (proportional) control. The PI control can eliminate a steady-state deviation between the measured voltage and a target value (discharging lower limit voltage Vb_min or OCV). The PID control can prevent the target value from overshooting, thereby shortening time for converging to the target value. Each parameter of the PID may be experimentally determined from a form, mechanism structure, or the like of the cell, or may be determined using simulation.

Note that, in the present exemplary embodiment, it is not a final goal to maintain the voltage difference at the target value. Accordingly, the I control and the P control do not necessarily need to be added thereto. In the present exemplary embodiment, if the voltage difference overshoots the target value, the control changing from heating to cooling will not be introduced. Therefore, basically, it is difficult for the voltage difference to coincide with the target value continuously.

Controller 16 may correct the determined heating amount according to the measured temperature of battery pack 11. For instance, as a degree to which the temperature of battery pack 11 falls below the heating threshold temperature becomes large, controller 16 corrects a heating amount so as to increase correction coefficient α (α>1) by which the heating amount is multiplied.

Figure 5:
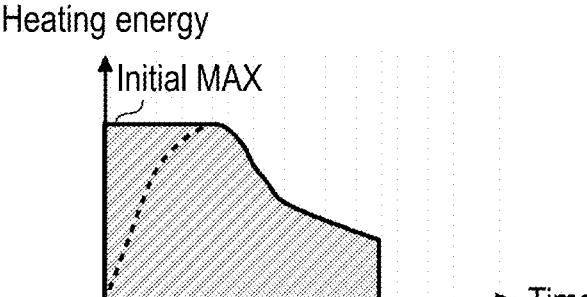
FIG. 5 is a view showing a transition image of the heating energy from the heating unit to the battery pack through heating control during low-temperature discharging in accordance with a modification of the executed example.

FIG. 5 is a view showing a transition image of heating energy from heating unit 17 to battery pack 11 through heating control during low-temperature discharging in accordance with a modification of the executed example. Since each cell in battery pack 11 has a heat capacity, it takes time from when heating is started until when the temperature of battery pack 11 begins to rise. In the modification, at the beginning of heating, battery pack 11 is heated at the maximum heating amount. This makes it possible to shorten time until when the temperature of battery pack 11 begins to rise.

Controller 16 adjusts a heating amount, which is supplied from heating unit 17 to battery pack 11, to a predetermined heating amount (e.g., the maximum heating amount) for a predetermined time from when low-temperature discharging is started. As the predetermined time, a fixed time set in advance may be employed, or a period until when the temperature of battery pack 11 begins to rise may be employed.

Figure 6:
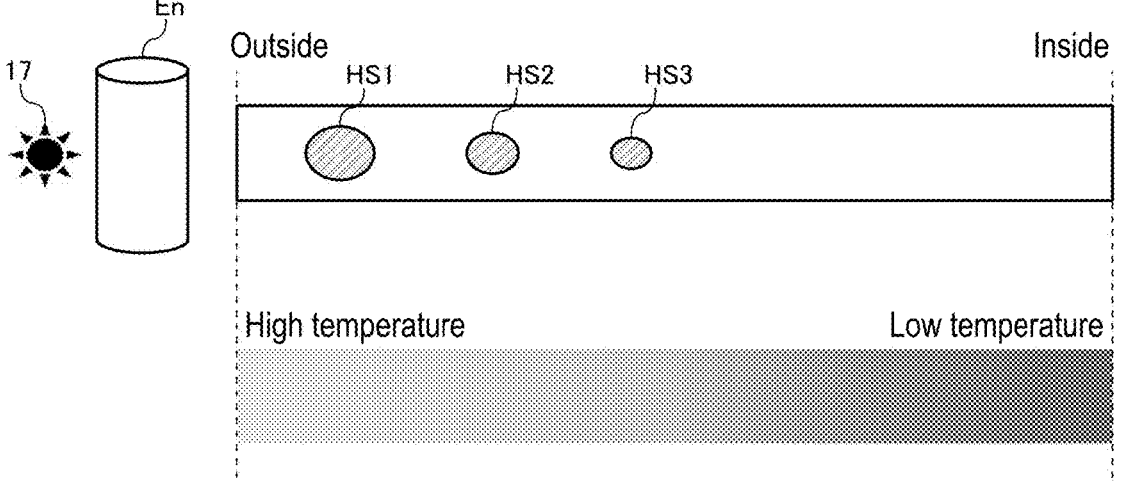
FIG. 6 is a view showing a first image of temperature distribution of a cylindrical cell.

FIG. 6 is a view showing a first image of temperature distribution of a cylindrical cell. Cylindrical cell En is configured such that an electrode body and electrolytic solution are accommodate in a cylindrical outer covering can. Herein, the electrode body is constituted such that positive/negative belt-like plates, which are laminated via a separator, are wound in a longitudinal direction. FIG. 6 shows an example in which heating unit 17 (a heating heater, a heating sheet, or a flow path of heated water), serving as a heating element, is disposed to be in contact with or close to a part of a circumferential surface of cylindrical cell En. When the belt-like plate is developed, a portion in contact with or close to heating unit 17 corresponds to hot spots HS1 to HS3.

Hot spot HS1, which is located on the leftmost side, is a portion in contact with or close the outermost circumference and has the largest hot spot. Hot spot HS2, which is located on the right side of hot spot HS1, is a hot spot on the second round. Hot spot HS3, which is located on the right side of hot spot HS2, is a hot spot on the third round. The hot spot becomes smaller as it goes to the center of the outer covering can. To describe easy understandingly, the HS of the view is illustrated as an image. However, in practice, the temperature becomes high as it goes from the center of the plate to an outer circumference thereof, due to heat capacity of the outer covering can.

Figure 7:
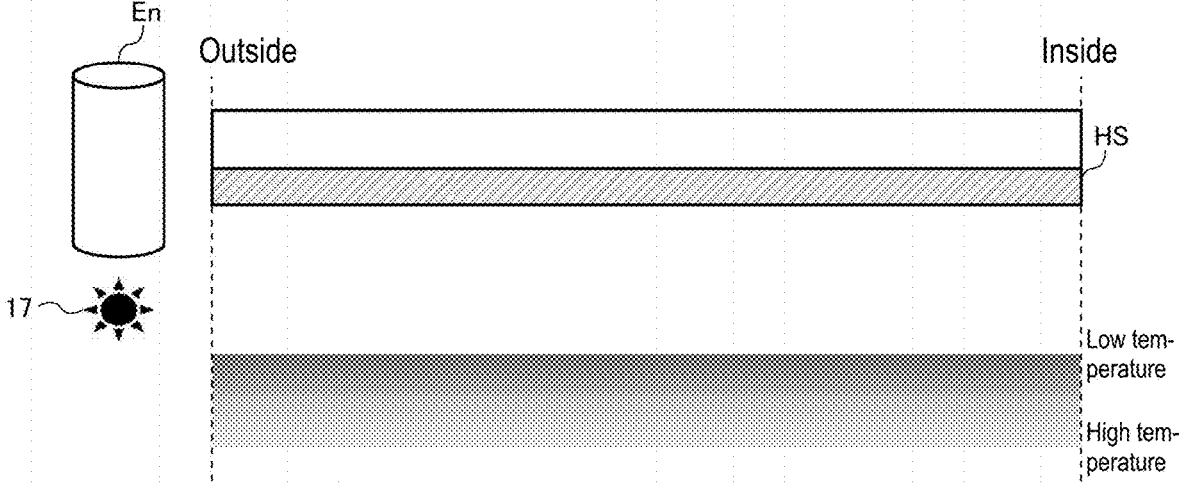
FIG. 7 is a view showing a second image of temperature distribution of the cylindrical cell.

FIG. 7 is a view showing a second image of temperature distribution of the cylindrical cell. FIG. 7 shows an example in which heating unit 17, serving as a heating element, is disposed in contact with or close to a bottom surface of cylindrical cell En. When the belt-like plate is developed, a bottom portion in contact with or close to heating unit 17 corresponds to hot spot HS. Like FIG. 6, the HS is described for simplicity but in practice, the temperature becomes high as it approaches the bottom surface of the outer covering can in contact with or close to heating unit 17. This is because the heat capacity in a transverse direction of the plate is basically the same.

Figure 8:
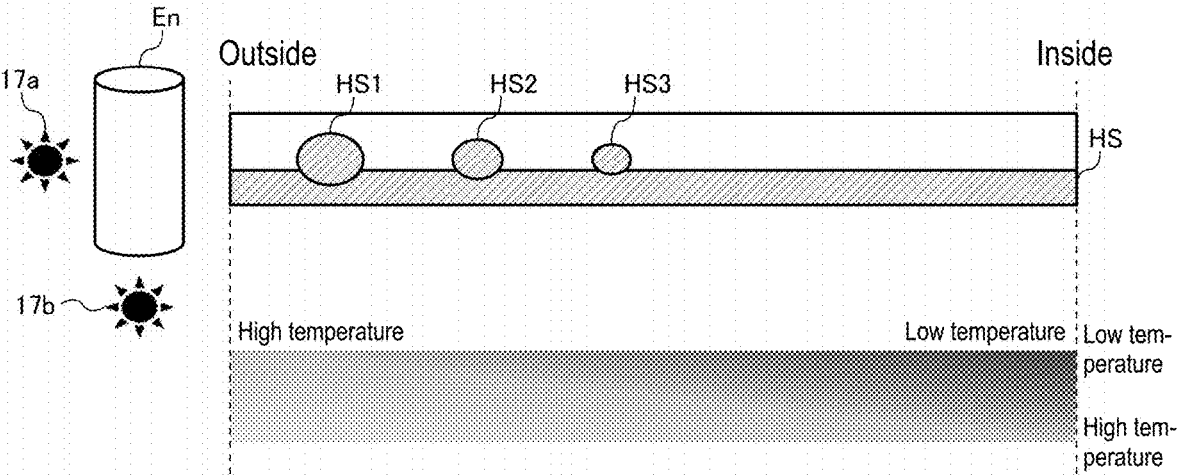
FIG. 8 is a view showing a third image of temperature distribution of the cylindrical cell.

FIG. 8 is a view showing a third image of temperature distribution of the cylindrical cell. An outer covering can of the cylindrical cell is constituted by a bottomed cylindrical body that has an opening, and a sealing body that closes the opening. The sealing body is generally configured to be fixed to the body via an insulator by caulking processing or the like. In the cylindrical cell configured in such a manner, the heat to be transmitted from the body to the sealing body may be intercepted by the insulator. For that reason, even if a heater is disposed on either side of 17a or 17b, the heating from the outer circumference and the bottom surface will be transmitted to the plate due to influence of a large heat capacity and a sufficient heat conduction of the outer covering can, so that an upper part of an inner circumference is not heated in practice.

Especially, for cylindrical cell En, to heat the entire surface thereof is difficult and, basically, the heating applies local. In the local heating, a temperature rise occurs at a part of the plate, so that a deterioration reaction concentrates on a local portion. Since this local portion is fixedly determined according to an installation position of heating unit 17, deterioration of the local portion is promoted. If the deterioration is promoted at the local portion, a life of the cell will be shortened. In FIGS. 6 through 8, the cylindrical cell is described as an example. However, even in a prismatic cell and a pouch cell, a hot spot occurs at a part of the plate, so that deterioration, caused by the hot spot, is promoted like the cylindrical cell.

To prevent the deterioration promotion at the local portion, a heating amount from heating unit 17 to battery pack 11 is set to have the maximum value. The maximum value of heating amount is set based on an allowable temperature at a local highest temperature position in the cell as a reference. The local highest temperature position in the cell is dependent on a cell structure and a positional relationship between heating unit 17 and the cell. The local highest temperature position in the cell, which depends on cell materials, is determined based on an experiment or a simulation. Furthermore, the maximum value of heating amount may be specified by a variation value. The variation value is derived based on a previously prepared table or a function in consideration of influences such as temperature, an SOC, and an SOH.

In the first heating control method mentioned above, a heating amount is derived to be inversely proportional to a voltage difference between measured voltage Vb_ccv and discharging lower limit voltage Vb_min. Therefore, when measured voltage Vb_ccv becomes close to discharging lower limit voltage Vb_min, the heating amount is likely to become too much large. If a maximum value is set to the heating amount, deterioration promotion of the cell, which caused by excessive heating, can be prevented.

In the second heating control method mentioned above, a heating amount is derived to be proportional to a voltage difference between an OCV and discharging lower limit voltage Vb_min. Therefore, even when measured voltage Vb_ccv becomes close to discharging lower limit voltage Vb_min, a heating amount is not likely to become too much large. However, for long traveling, the OCV is affected and lowers. Therefore, the OCV needs to be corrected according to a current integrated value from when traveling is started. Specifically, controller 16 estimates the current SOC based on an SOC at the time when traveling is started and a current integrated value from when the traveling is started. Further, controller 16 estimates the current OCV based on the current SOC and an SOC-OCV curve.

Figure 9:
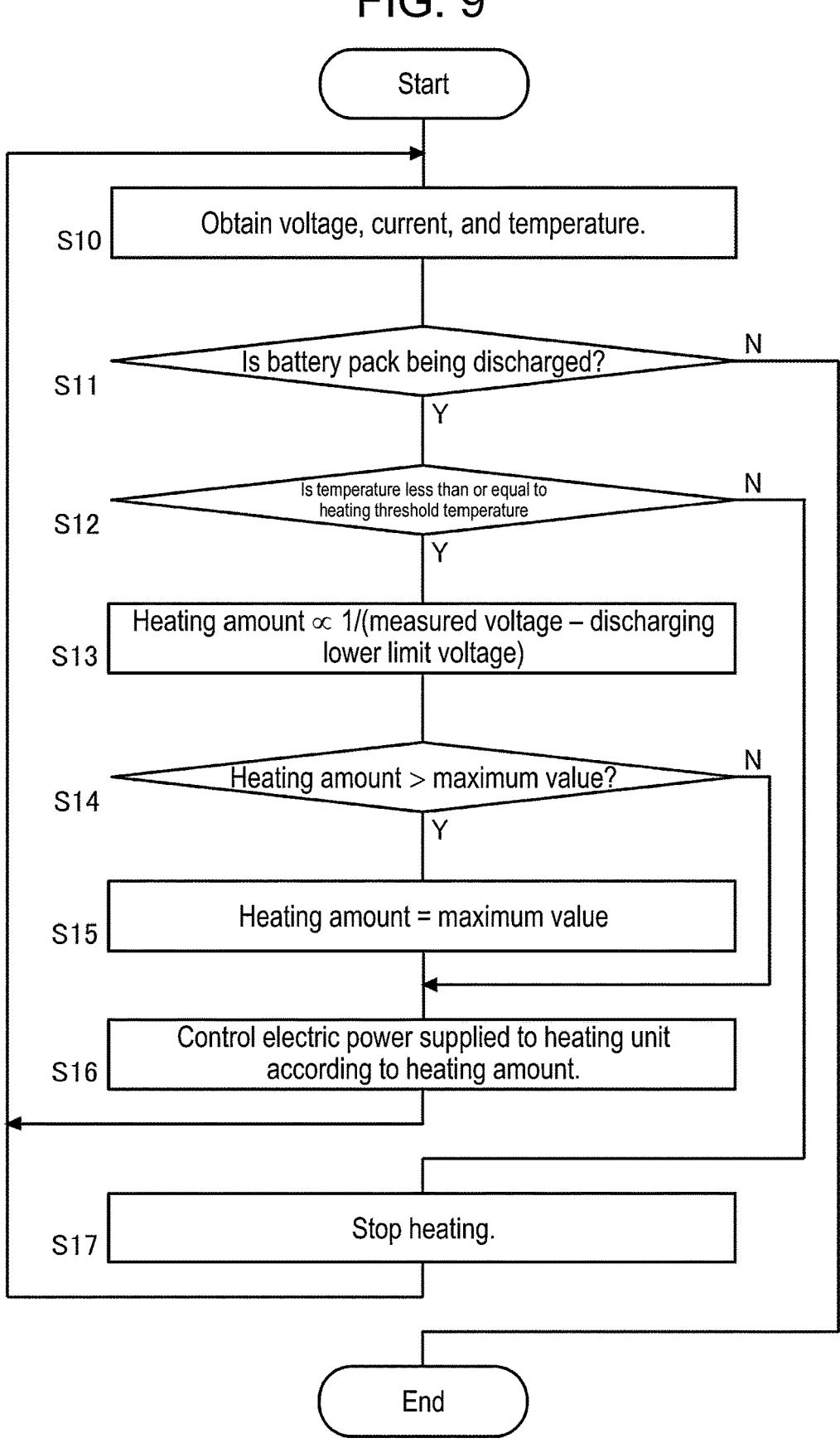
FIG. 9 is a flowchart showing a processing flow of a first heating control method.

FIG. 9 is a flowchart showing a processing flow of the first heating control method. Controller 16 obtains a terminal voltage, a current, and a temperature of battery pack 11 (S10). Controller 16 determines whether battery pack 11 is being discharged or not based on the current flowing into battery pack 11 (S11). When battery pack 11 is not being discharged (N at S11), heating control is completed. When battery pack 11 is being discharged (Y at S11), controller 16 compare a temperature within battery pack 11 and a heating threshold temperature (S12). For simplicity, in the flowchart of FIG. 9, the heating threshold temperature and a heating stop temperature are assumed to be the same.

When the temperature within battery pack 11 is less than or equal to the heating threshold temperature (Y at S12), controller 16 derives a heating amount to be inversely proportional to a voltage difference between measured voltage Vb_ccv and discharging lower limit voltage Vb_min of battery pack 11 (S13). Controller 16 compares the derived heating amount and the maximum value set in advance (S14). When the heating amount exceeds the maximum value (Y at S14), controller 16 restricts the heating amount to the maximum value (S15). When the heating amount is less than or equal to the maximum value (N of S14), the processing of step S15 is skipped. Controller 16 controls electric power, which is supplied to heating unit 17, according to the determined heating amount (S16). The process is shifted to step S10.

In step S12, when the temperature within battery pack 11 exceeds the heating threshold temperature (N at S12), controller 16 stops the power supply to heating unit 17, thereby stopping heating (S17). For not heating, the state is continued. The process is shifted to step S10.

Figure 10:
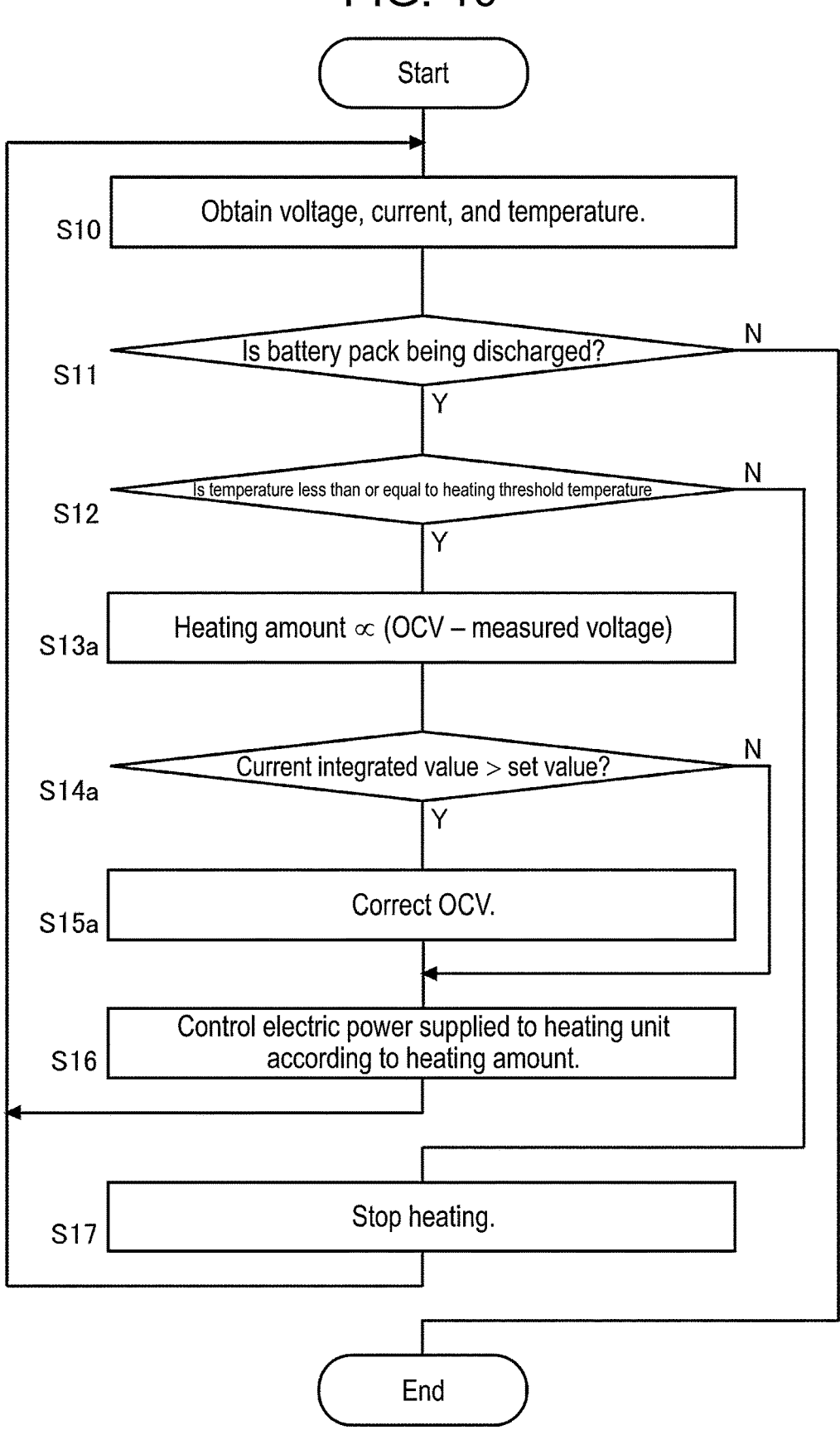
FIG. 10 is a flowchart showing a processing flow of a second heating control method.

FIG. 10 is a flowchart showing a processing flow of the second heating control method. Hereinafter, a different point from the flowchart shown in FIG. 9 will be described. In step S12, when the temperature within battery pack 11 is less than or equal to the heating threshold temperature (Y at S12), controller 16 derives a heating amount to be proportional to a voltage difference between OCV of the battery pack 11 and discharging lower limit voltage Vb_min (S13*a*). Controller 16 compares a current integrated value from when discharging is started and a set value (S14*a*). When the current integrated value exceeds the set value (Y at S14*a*), controller 16 corrects the existing OCV to the current OCV (S15*a*). When the current integrated value is less than or equal to the set value (N at S14*a*), the processing of step S15*a* is skipped. The other processing is the same as the processing shown in the flowchart of FIG. 9.

Figure 11:
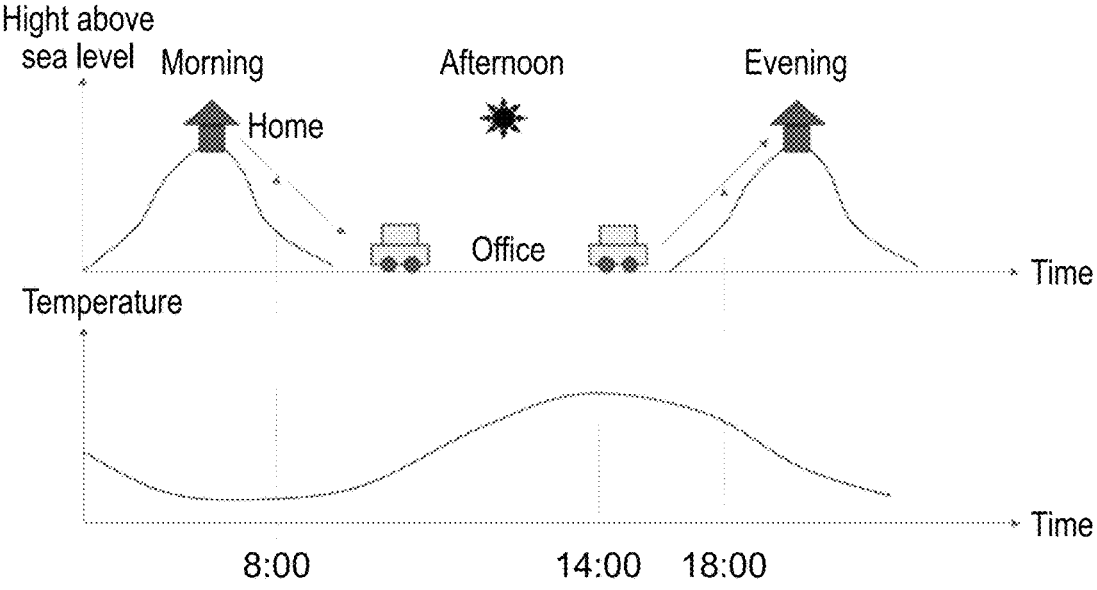
FIG. 11 is a view schematically illustrating a scene in which a certain user uses the electric vehicle.

FIG. 11 is a view schematically drawing a scene in which a certain user uses electric vehicle 1. A user's home is located at the top of a mountain, and an office is located on a level land where the user descends the mountain. The user commutes therebetween using electric vehicle 1. Temperature is low in early morning, becomes high at daytime, and lowers from the evening. The user goes down a slope around 8:00, and goes to his/her office. Further, around 18:00, the user goes up a slope to go home from the office.

Usually, an SOC of battery pack 11 is close to a fully-charged state at the time of morning start. In addition to this, the internal resistance thereof is high because the temperature is low. Therefore, only by causing a little charge current to flow thereinto, battery pack 11 is easily overcharged. Accordingly, when electric vehicle 1 goes down the slope, battery pack 11 is likely to be overcharged by the regenerative power. Under such a situation, there are a merit and a demerit in heating battery pack 11.

The main merit of heating is that the terminal voltage is hardly increased to a charge stop voltage, even if charge current become large, and the terminal voltage of battery pack 11 is hardly decreased to a discharging lower limit voltage even if discharge current become large, because the internal resistance can be lowered. The main demerit of heating is to consume the capacity of battery pack 11.

When the heating control is performed, a large discharge current can hardly flow through motor 5. As a result, a torque of motor 5 is restricted, and acceleration is suppressed. Further, since a large charge current can hardly flow through battery pack 11, regenerative charge is suppressed. In this condition, a mechanical brake is mainly used in running, so that regenerative energy is exhausted as heat basically. On the other hand, when the heating control is not performed, energy to be consumed by heating unit 17 can be saved, thereby making it possible to prevent a decrease in capacity of battery pack 11. Although depending on a driving route, when heating energy required for recovering is compared with an increase in recovery amount of regenerative energy, the heating energy is usually large at low temperature in many cases.

A heating mode (intensity of heating control) may be selectable by a user. For instance, by cooperation of controller 16, vehicle controller 20, and car-navigation system 34, car-navigation system 34 may be caused to display a selection screen of the heating mode. For instance, as the heating mode, "weak," "medium," and "strong" modes may be selectable. Preferably, an explanatory note is added to the selection screen. Herein, the explanatory note indicates that a degree to which acceleration is restricted becomes large, a receiving amount of regenerative power becomes small, and exhaustion of a battery is reduced in order of "weak"→"medium"→"strong." Further, the explanatory note indicates that cycle degradation is improved by shallowing a DOD (Depth Of Discharge).

Further, controller 16 may learn positional information, a charge-and-discharge pattern (including regenerative charge), and a temperature pattern, thereby determining an optimal heating mode for every temperature region during commuting. Now, the positional information is detected by GPS sensor 32, the charge-and-discharge pattern is based on measurement data of voltage and current, and the temperature pattern is based on measurement data of temperature. For instance, in consideration of a magnitude relationship between an amount of regenerative power and a saving amount of power consumption in heating unit 17, a necessity for acceleration, or the like, the heating mode is determined.

Note that, controller 16 may control second switch SW2 to turned off and third switch SW3 to be turned on during a period for which motor 5 generates regeneration power, and supply the regeneration power to heating unit 17 via DC/DC converter 18 without supplying the regenerative power, which is supplied from inverter 6, to battery pack 11.

Controller 16 may determine the heating mode based on a distance between a destination, which is inputted to car-navigation system 34, and the current position detected by GPS sensor 32. For instance, when the distance between the destination and the current position is less than a set value (e.g., 3 km), controller 16 may stop heating or reduce a heating amount. For short distance traveling, heating energy is generally consumed uselessly in many cases, because the car has arrived at the destination before the temperature completely rises after start of heating. Further, in many cases, even if the heating is stopped substantially five minutes prior to the destination arrival, the temperature is not generally decreased sufficiently until the destination arrival due to an influence of heat capacity of each cell. Further, when a difference between an amount of electric power corresponding to an SOC of battery pack 11 and a moving energy required for traveling to the destination is less than or equal to a predetermined value, the heating may be stopped, thereby prioritizing the traveling to the destination.

Figure 12:
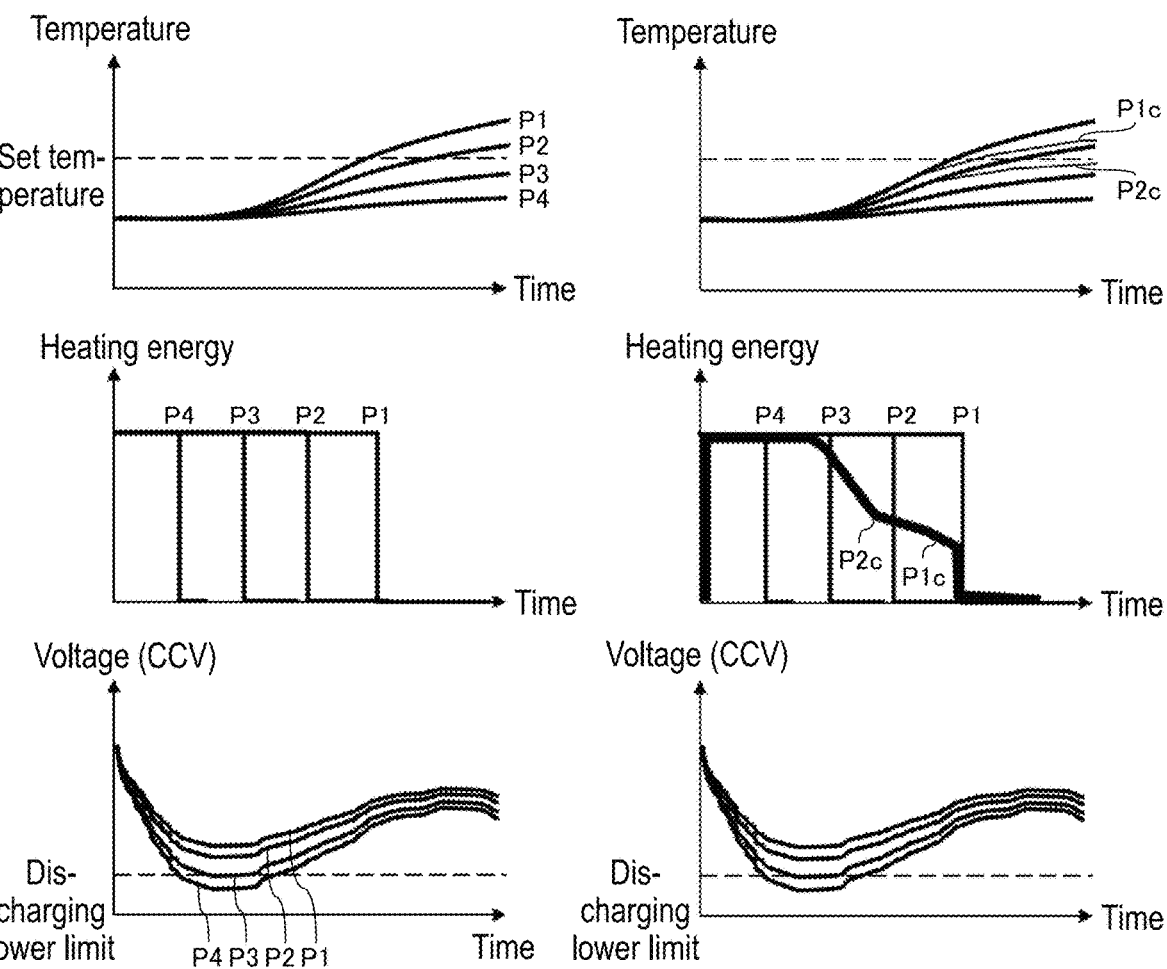
FIG. 12 is a view showing variation images of temperature of the battery pack, heating energy from the heating unit to the battery pack, and terminal voltage (CCV) of the battery pack through heating control during low-temperature discharging.

FIG. 12 is a view showing variation images of temperature of battery pack 11, heating energy from heating unit 17 to battery pack 11, and terminal voltage (CCV) of battery pack 11 through heating control during low-temperature discharging. FIG. 12 assumes the state where constant-current discharging is performed.

The example shown in the left-hand side is an example in which a stop timing is changed in the state where a heating amount is fixed. When heating is stopped at timing P4 or P3, a terminal voltage (CCV) falls below a discharging lower limit voltage. Therefore, the heating is required to be continued until timing P2 or P1.

The example shown in the right-hand side is an example in which a heating amount and a stop timing are changed. For heating is stopped at timing P2, a heating amount is gradually decreased (P2c). In this condition, the temperature rise is moderated, compared with when a fixed heating amount is maintained until timing P2. Furthermore, when heating is stopped at timing P1, the heating amount is gradually decreased after timing P2 (P1c). In this condition, the temperature rise is moderated, compared with when a fixed heating amount is maintained until timing P1. In either example, capacity of battery pack 11 can be saved.

As described above, the present exemplary embodiment can optimize heating energy to be used for heating low-temperature battery pack 11 reasonably, thereby using battery energy for an original target load (e.g., motor 5) without consuming the energy excessively. In other words, the present exemplary embodiment can decrease the voltage until a discharging lower limit voltage, while reducing useless consumption of battery energy for heating. This prevents a restriction in usage of a target load.

The heating control in accordance with the present exemplary embodiment can maintain discharging under low temperatures without increasing self-consumption of battery pack 11 excessively, as compared with a method of heating battery pack 11 uniformly. Further, in the heating control in accordance with the present exemplary embodiment, it is not necessary to separate an OCV from a CCV. Additionally, a margin including an estimated error is also not necessary, and the margin can be return to the supply to an original target load. Further, by suppressing excessive consumption of heating energy, the DOD (Depth Of Discharge) of battery pack 11 can be shallowed, thereby contributing to deterioration suppression of battery pack 11.

As mentioned above, the present disclosure has been described according to the exemplary embodiment. The exemplary embodiment is illustrative, and various modifications are possible in a combination of each component and each handling process of those. Further, a person skilled in the art will understand that such modifications are also included within the present disclosure.

In the above-mentioned exemplary embodiment, there has been described an example in which a heating amount, which is applied to the entirety of battery pack 11, is feedback-controlled according to the terminal voltage of battery pack 11. In that regard, a plurality of cells E1 to En or a plurality of parallel cell blocks, which are included in battery pack 11, may be divided into a plurality of areas in a series direction. At least one temperature sensor may be disposed for each of the areas to isolate heating unit 17 for every area, thereby performing heating control for every area. In this condition, a plurality of feedback loops will coexist.

Determination processing of the heating amount, mentioned above, may be executed on a cloud. Controller 16 samples battery data periodically (e.g., 10 second interval) and transmits them to vehicle controller 20 through an in-vehicle network. Herein, the battery data include voltage, current, temperature, and an SOC of each of cells E1 to En or each of parallel cell blocks in battery pack 11. Vehicle controller 20 transmits the received battery data to a battery analysis server (not shown) using a wireless communication unit (not shown). The battery analysis server determines a heating amount using the control algorithm mentioned above, and retransmits it to electric vehicle 1.

In the above-mentioned exemplary embodiment, a typical electric vehicle with four wheels is assumed as electric vehicle 1. In that regard, an electric motorcycle (electric scooter), a battery-assisted bicycle, and an electric kick motor scooter may be employed. Further, not only a fully-standardized electric vehicle but a slow-moving electric vehicle, such as a golf cart or a land car, are included in the electric vehicle. Still further, a large-sized electric vehicle, such as a construction equipment vehicle, is also included therein. Further, a target equipped with power supply system 10 in accordance with the exemplary embodiment is not limited to electric vehicle 1. The target also includes a railway vehicle, an electric moving body such as a multi-copter (drone), and a consumer electronic device (a PC, a tablet, a smart phone, or the like).

Note that, the exemplary embodiment may be specified by the following items.

[ITEM 1] Power supply system (10) includes:
battery (11):
heating unit (17) for heating above-mentioned battery (11):
voltage measurement unit (13) that measures a voltage of above-mentioned battery (11);
temperature measurement unit (14) that measures a temperature of above-mentioned battery (11); and
control unit (16) that determines that the measured temperature of above-mentioned battery (11), which is measured by above-mentioned temperature measurement unit (14), is a temperature at which above-mentioned heating unit (17) is started, and controls a heating amount from above-mentioned heating unit (17) to above-mentioned battery (11) adaptively according to a voltage difference between the measured voltage during discharging of above-mentioned battery (11) and a reference voltage, based on the measured temperature of above-mentioned battery (14).

According to this, the energy used for heating battery (11) can be optimized, so that battery energy can effectively be utilized.

[ITEM 2] Power supply system (10) described in item 1, wherein above-mentioned control unit (16) controls a heating amount from above-mentioned heating unit (17) to above-mentioned battery (11) based on a difference between the measured temperature, which is measured by above-mentioned temperature measurement unit (14), and a heating threshold temperature that is set based on discharge characteristics of above-mentioned battery (11).

According to this, the voltage of battery (11) can be controlled so as not to be less than or equal to a discharging lower limit voltage.

[ITEM 3] Power supply system (10) described in item 1 or 2, wherein above-mentioned control unit (16) increases the above-mentioned heating amount as a voltage difference between the measured voltage during discharging of above-mentioned battery (11) and the discharging lower limit voltage becomes small.

According to this, battery energy can be saved in a region at which the measured voltage has a surplus amount until reaching the discharging lower limit voltage.

[ITEM 4] Power supply system (10) described in item 1 or 2, wherein above-mentioned control unit (16) increases above-mentioned heating amount as a voltage difference between an OCV (Open Circuit Voltage) of above-mentioned battery (11) and the measured voltage during discharging of above-mentioned battery (11) becomes large.

According to this, battery energy can be saved in a region at which the measured voltage has a surplus amount until reaching the discharging lower limit voltage.

[ITEM 5] Power supply system (10) described in any one of items 1 to 4, wherein above-mentioned control unit (16) adjusts the above-mentioned heating amount to a predetermined heating amount for a predetermined time from when discharging of above-mentioned battery (11) is started.

This can shorten time until when temperature of battery (11) rises.

[ITEM 6] Power supply system (10) described in any one of items 1 to 5, wherein a maximum value of the above-mentioned heating amount is set based on an allowable temperature at a local highest temperature position in above-mentioned battery (11) as a reference.

According to this, excessive heating can be prevented.

[ITEM 7] Power supply system (10) described in any one of items 1 to 6, wherein above-mentioned power supply system (10) is mounted in electric vehicle (1).

According to this, traveling stop of electric vehicle (1) or reduction of drivable distance can be prevented.

[ITEM 8] Power supply system (10) described in item 7, wherein when a distance between the current position of above-mentioned electric vehicle (1) and a destination of above-mentioned electric vehicle (1) becomes less than a set value, above-mentioned control unit (16) reduces the above-mentioned heating amount or sets the above-mentioned heating amount to zero.

According to this, useless heating can be avoided.

[ITEM 9] Power supply system (10) described in item 7 or 8, wherein above-mentioned control unit (16) changes intensity of heating control according to selection of a user.

According to this, needs of a user can be reflected on heating control.

[ITEM 10] Power supply system (10) described in any one of items 7 to 9, wherein above-mentioned control unit (16) supplies regenerative power, which is supplied from above-mentioned electric vehicle (1), to above-mentioned heating unit (17) without supplying the regenerative power to above-mentioned battery (11).

This can effectively utilize regenerative energy, while preventing an overcharge.

[ITEM 11] A heating control method including the steps of:

obtaining a measured voltage of battery (11);

obtaining a measured temperature of above-mentioned battery (11); and controlling a heating amount from heating unit (17), which heats above-mentioned battery (11), to above-mentioned battery (11) adaptively according to a voltage difference between the measured temperature during discharging of above-mentioned battery (11) and a reference voltage, based on the measured temperature of above-mentioned battery (11), at low temperature at which the measured voltage of above-mentioned battery (11) is less than or equal to a predetermined temperature.

According to this, energy used for heating battery (11) can be optimized, so that battery energy can effectively be utilized.

[ITEM 12] A heating control program executed by a computer, the heating control program including:

processing that obtains a measured voltage of battery (11);

processing that obtains a measured temperature of above-mentioned battery (11); and processing that controls a heating amount from heating unit (17), which heats above-mentioned battery (11), to above-mentioned battery (11) adaptively according to a voltage difference between the measured voltage during discharging of above-mentioned battery (11) and a reference voltage, based on the measured temperature of above-mentioned battery (11), at low temperature at which the measured temperature of above-mentioned battery (11) is less than or equal to a predetermined temperature.

According to this, energy used for heating battery (11) can be optimized, so that battery energy can effectively be utilized.

REFERENCE MARKS IN THE DRAWINGS 1 electric vehicle, 2f front wheel, 2r rear wheel, 3f front wheel axle, 3r rear wheel axle, 4 transmission, 5 motor, 6 inverter, 10 power supply system, 11 battery pack, 12 management unit, 13 voltage measurement unit, 14 temperature measurement unit, 15 current measurement unit, 16 control unit, 17 heating unit, 18 DC/DC converter, E1 to En cells, Rs shunt resistor, T1 to T2 temperature sensors, 20 vehicle control unit, 31 vehicle speed sensor, 32 GPS sensor, 33 gyroscope sensor, 34 car-navigation system, SW1 to SW3 switches.

The invention claimed is:

1. A power supply system comprising:

a battery:

a heater for heating the battery;

a voltage measurer that measures a voltage of the battery;

a temperature measurer that measures a temperature of the battery; and a controller that determines whether the measured temperature of the battery measured by the temperature measurer is a temperature at which the heater is started, and controls a heating amount from the heater to the battery adaptively, according to a voltage difference between the measured voltage during discharging of the battery and a reference voltage, wherein the controller increases the heating amount as a voltage difference between the measured voltage during discharging of the battery and a discharging lower limit voltage decreases.

2. The power supply system according to claim 1, wherein the controller adjusts the heating amount to a predetermined heating amount for a predetermined time from when discharging of the battery is started.

3. The power supply system according to claim 1, wherein a maximum value of the heating amount is set based on an allowable temperature at a local highest temperature position in the battery as a reference.

4. The power supply system according to claim 1, wherein the power supply system is mounted in an electric vehicle.

5. The power supply system according to claim 4, wherein when a distance between a current position of the electric vehicle and a destination of the electric vehicle is less than a set value, the controller reduces the heating amount or sets the heating amount to zero.

6. The power supply system according to claim 4, wherein the controller changes intensity of heating control according to selection of a user.

7. The power supply system according to claim 4, wherein the controller supplies regenerative power to the heater without supplying the regenerative power to the battery, the regenerative power being supplied from the electric vehicle.

8. A heating control method comprising:

obtaining a measured voltage of a battery;

obtaining a measured temperature of the battery; and controlling a heating amount adaptively according to a voltage difference between the measured voltage during discharging of the battery and a reference voltage, at low temperature at which the measured temperature of the battery is less than or equal to a predetermined temperature, the heating amount being supplied to the battery from a heater for heating the battery, wherein the controlling increases the heating amount as a voltage difference between the measured voltage during discharging of the battery and a discharging lower limit voltage decreases.

9. A non-transitory machine-readable recording medium that stores a heating control program executed by a computer, the heating control program comprising:

processing that obtains a measured voltage of a battery;

processing that obtains a measured temperature of the battery; and processing that controls a heating amount adaptively according to a voltage difference between the measured voltage during discharging of the battery and a reference voltage, at low temperature at which the measured temperature of the battery is less than or equal to a predetermined temperature, the heating amount being supplied to the battery from a heater for heating the battery, wherein the process controlling the heating amount increases the heating amount as a voltage difference between the measured voltage during discharging of the battery and a discharging lower limit voltage decreases.

* * * * *